United States Patent
Bocchetti

(10) Patent No.: US 10,043,023 B2
(45) Date of Patent: Aug. 7, 2018

(54) METHOD AND DEVICE TO ACCESS PERSONAL DATA OF A PERSON, A COMPANY, OR AN OBJECT

(71) Applicant: Nagravision S.A., Cheseaux-sur-Lausanne (CH)

(72) Inventor: Salvatore Bocchetti, Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 690 days.

(21) Appl. No.: 14/614,155

(22) Filed: Feb. 4, 2015

(65) Prior Publication Data
US 2015/0242647 A1    Aug. 27, 2015

(30) Foreign Application Priority Data
Feb. 24, 2014 (EP) .................................... 14156392

(51) Int. Cl.
| | | |
|---|---|---|
| G06F 7/04 | (2006.01) | |
| G06F 21/62 | (2013.01) | |
| H04L 29/06 | (2006.01) | |

(52) U.S. Cl.
CPC ...... G06F 21/6218 (2013.01); G06F 21/6245 (2013.01); G06F 21/6254 (2013.01); H04L 63/10 (2013.01)

(58) Field of Classification Search
USPC ..................................... 726/2; 707/783, 781
See application file for complete search history.

(56) References Cited

U.S. PATENT DOCUMENTS 6,185,316 B1 *  2/2001  Buffam ................... G06F 21/32
                                                382/100
8,069,053 B2 * 11/2011  Gervais ............... G06F 21/6254
                                                705/1.1
(Continued)

FOREIGN PATENT DOCUMENTS

WO    WO-2008122627 A1    10/2008

OTHER PUBLICATIONS

European Search Report dated Mar. 27, 2014.

*Primary Examiner* — Amare F Tabor
(74) *Attorney, Agent, or Firm* — Harness, Dickey & Pierce, P.L.C.

(57) ABSTRACT

This invention aims to propose a method and a system allowing to supply certified reliable information without the source of the information being transmitted to the applicant. This invention proposes an access method to the data of at least one person or company or object, stored in a secure database on a removable support, these data comprising quantitative or qualitative data, each datum comprising at least one describer and one value, this method comprising steps of initialization and of use, the initialization comprising the following steps:
- connecting the removable support to a device for acquiring information,
- authenticating at the database by demonstrating the right to at least one update,
- updating into the secure database, for a person or a company or an object, a current value corresponding to the describer of said datum;

the use comprising the following steps:
- connecting the removable support to a communication device,
- receiving a request from an requesting party, this request comprising at least one target describer and one operator, (Continued)

carrying out, by the respondent, the request by applying the operator on the current value corresponding to the target describer and producing a response,
returning the response to the requesting party.

12 Claims, 1 Drawing Sheet

(56) References Cited

U.S. PATENT DOCUMENTS

| | | | | |
|---|---|---|---|---|
| 8,458,487 | B1* | 6/2013 | Palgon | G06F 21/00 |
| | | | | 380/277 |
| 8,607,332 | B2* | 12/2013 | Canard | G06F 21/6254 |
| | | | | 713/165 |
| 8,645,763 | B2* | 2/2014 | Szegedi | G06F 21/6254 |
| | | | | 714/38.11 |
| 8,707,058 | B1* | 4/2014 | Bain | G06F 21/6245 |
| | | | | 713/193 |
| 8,806,218 | B2* | 8/2014 | Hatakeda | G06F 21/6245 |
| | | | | 713/182 |
| 9,021,604 | B2* | 4/2015 | Nicolas | H04L 63/102 |
| | | | | 709/224 |
| 2003/0115208 | A1* | 6/2003 | Fujiwara | G06F 17/30011 |
| 2005/0250472 | A1* | 11/2005 | Silvester | G06F 21/35 |
| | | | | 455/411 |
| 2006/0179073 | A1* | 8/2006 | Kimura | G06F 21/6245 |
| 2009/0222898 | A1* | 9/2009 | Veidung | G06F 19/322 |
| | | | | 726/7 |
| 2015/0040237 | A1* | 2/2015 | Vandervort | G06F 21/6254 |
| | | | | 726/26 |

* cited by examiner

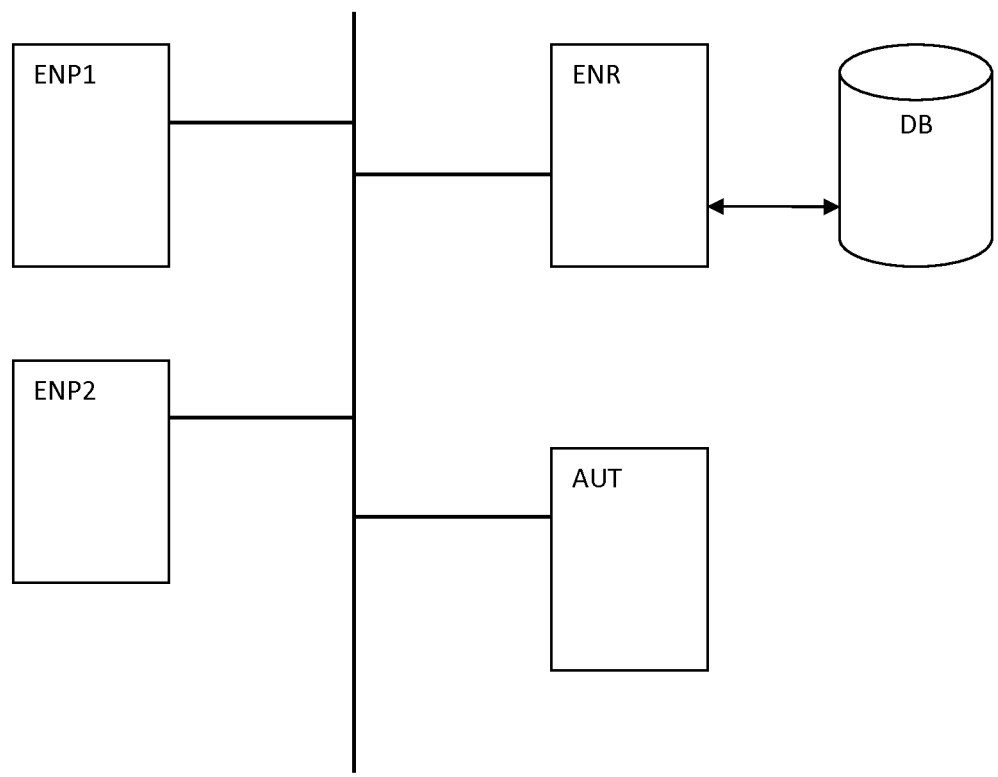

METHOD AND DEVICE TO ACCESS PERSONAL DATA OF A PERSON, A COMPANY, OR AN OBJECT

CROSS-REFERENCE TO RELATED APPLICATIONS

This application claims priority from and the benefit of European Patent Application No. 14156392.4, filed on Feb. 24, 2014, which is hereby incorporated by reference in its entirety for all purposes as if fully set forth herein.

INTRODUCTION

The present application refers to the domain of the protection of private or personal data, in particular data stored in databases used for authentication.

It may be desirable that data be accessible in order to allow an authorized third party to obtain reliable information in order to access services. This may be the case for obtaining a credit, a process during which the financial capacity of the applicant has to be verified. Other applications may concern the age of the person or its skills. It could also be the characteristics of an object such as performance, size, capacity.

The problem of such verifications is that the access to these data is open for the applicant party during the verification process.

Hence it is desirable that these base data, specific to a person or an object, are used without being disclosed, for example to ensure the conformity of the person or the object to conditions defined by an applicant party.

Moreover, the conformity to a request or to the conditions required by the requiring party has to be validated by an authority so that the response delivered by the requiring party can be reliable without having to disclose the raw data.

BRIEF DESCRIPTION OF THE INVENTION

This invention aims to propose a method and a system allowing to supply certified reliable information, without the source of the information being transmitted to the requiring party.

This invention proposes an access method to the data of at least one person or company or object stored in a secure database on a removable support, these data comprising quantitative or qualitative data, each datum comprising at least one describer and one value, this method comprising steps of initialization and of use, the initialization steps comprising the following steps:

connecting the removable support to a device for acquiring information,
   authenticating at the database by demonstrating the right to at least one introduction,
   introducing in the secure database, for a person or a company or an object, a current value corresponding to the describer of said datum;

the use comprising the following steps:

connecting the removable support to a communication device,
   receiving a request from a requiring party, this request comprising at least one target describer and one operator,
   carrying out, by the removable support, the request by applying the operator on the current value corresponding to the target describer and producing a response,
   returning the response to the requiring party.

Thus this invention can be a respondent which can have the form of a removable support such as a smart card, a mobile phone or any electronic element having memory capacity, storing the data of a person or company or object. Person means an individual or a group of persons such as a family. A company can also be an association or an organization. An object also has characteristics which can be used for authentication.

This invention proposes a limited access method for the data of a plurality of persons or companies or objects, stored in a secure database of a respondent, these data comprising quantitative or qualitative data, each datum comprising at least one describer and one value, this method comprising steps of initialization and of use, the initialization comprising the following steps:

authenticating at the database by demonstrating the right to at least one introduction,
   identifying at least one person or one object,
   introducing into the secure database, for said person or object, a current value corresponding to the describer of said datum, the use comprising the following steps:

receiving a request from a requiring party, this request comprising a person or object identifier, a target describer, an operator,
   carrying out, by the respondent, the request by applying the operator on the current value corresponding to the target describer and producing a response,
   returning the response to the requiring party.

Thus this method includes a first step of initialization, comprising the introduction or update of the data, and a second step of use, comprising the reception of requests, their treatment and response.

BRIEF DESCRIPTION OF THE DRAWINGS

The present application will be better understood by viewing the attached figures in which:

FIG. 1 shows the different components of the invention.

DETAILED DESCRIPTION

The method articulates around a respondent ENR having a database DB being able to store private data of person or company or object. The data are generally organized in the form of a recording, i.e. a set of data linked by a common definition.

Each record includes at least one describer (for example salary, profession, age, address etc.) and a value corresponding to said describer. Optionally, a certificate is associated to one or more records.

An example of certificate is known under the denomination X.509. In the X.509 system, a certification authority attributes a certificate linking a public key to a distinguished name, to an electronic address or a DNS record.

This certificate places the signature of a certification authority in the last field. Concretely this signature is realized by: an excerpt of all previous fields of the certificate, and an encryption of this excerpt by the private key of the certification authority. Anybody possessing the public key of this certification authority can decrypt the excerpt and compare it with the calculation of his own condensate of the certificate. If the two condensates are identical this ensures that the certificate is intact, it has not been modified. The certificate of the certification authority, which contains its public key, can also be signed by another certificate authority of higher level, thus forming a chain. On top of the chain one finds the most important certificates: the root certificates.

The root certificates are not signed, or self-signed, public keys which are relied upon. The software, like web browser or e-mail clients contain root certificates of many governmental or commercial certification authorities. When a browser opens a secure connection (TLS/SSL) towards a website possessing a certificate emitted by a known authority, it considers the site as secure as the certification path is validated. The switch into protected mode is then transparent.

During an initialization step, a company (a society, an organization) or a person can store private data in the respondent's database. In case of data related to an object, the data can be automatically stored (for example, values captured by a probe). The storing can also be temporary, for example if data are captured by a probe linked to a memory which has the function of "database". The respondent can be a removable support comprising a memory and means for processing the requests. This can be a mobile phone for example, temporarily connected to an applicant party by Bluetooth or NFC.

The database can comprise two types of describer, predefined and defined by the user.

In the first category there are all the predefined records for which it will be enough to fill the target value. They are the current data like date of birth, address, family situation or income.

The describer of the record is thus a simple value which refers to a definition list (for example, the value 27 of the describer means that the target value is the year of birth).

In the other type, the describer can be a freely editable field. Thus the person can define data types not predefined by the respondent ENR and associate the value of his choice to them.

The respondent's database is secured, i.e. introduction of data cannot be done without authorization. The database is protected by a strong authentication like the use of a one-time password, the use of an electronic certificate, or the use of biometric data.

According to a certification process, the data are then certified by an authority AUT which is shown as a distinct entity in FIG. 1. This authority can be integrated in the respondent or be a separate entity.

The certification process consists in involving a third party which can confirm the information. This authority AUT can with the help of other sources obtain information to corroborate the value stored in the database. Indeed, specialized societies have reliable information on persons or companies and can certify one or more values. For example on the application of the person, the respondent ENR can access to this authority AUT which is in the form of a specialized service (for example a bank for verifying the credit limit). Before, the respondent can ask the person for complementary data such as password or verification information. This complementary information will be added to the request transmitted to the authority in order to allow this authority to verify the legitimacy of the request. This authority has a certificate to sign the value transmitted in the request. As the database is realized with a protected element, which does not allow the extraction of information beyond that which is supposed to be a part of communication with the outside (ex. smart card, . . . ), the authority AUT will communicate its certificate to the protected element so that the latter can use it to sign the provided response. In another embodiment, the protected element will use another certificate for the signature which has been for its part verified and signed by an authority AUT.

Thus the respondent's database will comprise registrations organized with a data describer and one or more values as well as one or more certificates associated to authorities.

Subsequently, an applicant party ENP1, ENP2 can form a request to obtain a verification of information. This request will comprise an applicant party identifier, the datum describer (for example income), an operator (for example < or >) and secondarily a target value. The target value can be optional, for example during the verification of the access to a pub, it is sufficient that the describer is "age" and the operator is "of legal age?". A request can comprise several describers (for example home town and street) and/or several target values (for example a list of supposed employers). This request can be also signed by the applicant party in order to authenticate the request.

At the reception of this request, the respondent can determine the person this request is addressed to thanks to the identifier, and will find the related datum thanks to the describer and find the value corresponding to this datum.

The respondent then applies the operator on the value and obtains a response. This response will be mainly binary, either positive or negative, or a refusal to answer. The response can also contain a signature attached to this response. This response is sent to the requesting party. The response can comprise a copy of the question namely the target value, the operator, the identifier of the person.

According to a variant of the invention, when a request in received by the respondent, it forwards the request or a part of it to the person corresponding to the person identifier. This request is presented to a device for displaying to the person. Thus an identifier of the requesting party is presented, and the details of the request. The person can accept or refuse that a response is sent to the requesting party, but it cannot modify the result of the request if the transmission has been authorized by the person.

According to a variant of the invention, the treatment of the request differs according to the requesting party. The respondent will determine the category to which this requesting party belongs, and according to this category certain data will be accessible or not. The database DB includes a list of the possible requesting parties and their category. A official institution for example will be in category 4 (high trust value) while a simple store will be in category 1 (low trust level). In the same way, the data of the person or company can be classified according to the categories, thus allowing, during a request, to verify if the category to which the requesting party belongs authorizes the access to this datum. If the level attached to the data is equal or lower than the requesting party's level, the request is treated and the response is sent. In the negative, a response refusing the request is sent to the requesting party by the respondent.

A known method for extracting raw data from such a database is to send a large number of requests with varying target values. Thus for example if the income is targeted, a request asking if the income is lower than a first target value is sent and if the response is positive, the target value is incremented. Thus the value of the income corresponds to the moment in which the response changes. Thanks to this recurrent method, it is possible to know all the values of the database.

Thus according to the invention a request counter is added to the respondent and allows to limit the number of requests. The counter can be associated to the data set of a person, to a datum of a person, or to an requesting party, or to a set of the mentioned parameters. As a third example, at each request of a particular requesting party, the counter is incremented. A maximum is defined for the counter and when this maximum is reached, the respondent refuses any following requests. The counter can be reset by a respondent's operator, by the person or according to the expiration of a duration (e.g. after 1 day).

The control by the counter can be associated to a maximum for each time unit, for example 3 requests within 24 hours. Once this number is reached during the predefined time, any following requests are rejected. Once the period is expired, the counter is reset.

The invention claimed is:

1. A method for accessing personal data of at least one subject, the subject including a person, a company, or an object, stored in a secure database on a removable support, the personal data comprising quantitative or qualitative data, and each datum comprising at least one descriptor and one value, the method comprising:
    connecting the removable support to a device for acquiring information related to the subject;
    authenticating at the secure database by demonstrating a right to enter information associated with the subject;
    entering into the secure database for the subject a current value corresponding to the descriptor of the datum, the secure database including a request counter associated with one or a plurality of values associated with the datum;
    connecting the removable support to a communication device;
    receiving a request related to the subject from a requesting party, the request comprising at least one target descriptor and one operator;
    comparing a value of the request counter with a maximum value;
    carrying out the request by applying the operator on the current value corresponding to the target descriptor and producing a response when the value of the request counter is below the maximum value; and
    returning the response to the requesting party.

2. A method for limiting access data of a plurality of subjects, the plurality of subjects including a plurality of people, companies, or objects, stored in a secure database of a respondent, the data comprising quantitative or qualitative data, each datum comprising at least one descriptor and one value, the method comprising:
    authenticating at the secure database by demonstrating a right to enter information into the secure database;
    identifying at least one subject;
    entering into the secure database for the subject a current value corresponding to the descriptor of the datum, the secure database including a request counter associated with one or a plurality of values associated with the datum;
    receiving a request related to the at least one subject from a requesting party, the request comprising an identifier for the at least one subject, a target descriptor, and an operator;
    comparing a value of the request counter with a maximum value;
    carrying out the request by applying the operator on the current value corresponding to the target descriptor and producing a response when the value of the request counter is below the maximum value; and
    returning the response to the requesting party.

3. The method according to claim 1, the method further comprising:
    certifying the entry of the current value, the certifying including adding a certificate emitted by an authority to the datum of the secure database; and
    adding the certificate to the response sent to the requesting party.

4. The method according to claim 1, wherein
    the requesting party has a certificate;
    the request from the requesting party including the certificate to digitally sign the request; and
    the method further comprises,
        verifying the certificate prior to the carrying out the request.

5. The method according to claim 1, wherein the descriptor is of an index type and further includes an index value corresponding to the type of the descriptor.

6. The method according to claim 1, wherein
    the descriptor is of the type free field;
    contents of the type free field being initialized during the entering of the current value into the secure database; and
    the method further comprises,
    during the reception of the target descriptor of the request, carrying out a search by comparing the target descriptor with the contents of the descriptors of the secure database.

7. The method according to claim 1, further comprising:
    once the request has been received, transmitting a message to a person identified by a person identifier of the request from the requesting party, the message including at least the target descriptor;
    displaying, on a device of the person, the target descriptor;
    receiving a command on behalf of the person, the command authorizing or forbidding the request; and
    authorizing or denying the carrying out of the request according to the value of the command.

8. The method according to claim 7, wherein the request includes an identifier of the requesting party, and the requesting party identifier is displayed on the device of the person associated with the target descriptor.

9. The method according to claim 1, wherein the request includes a requesting party identifier, and the method further comprises:
    organizing the data of a person according to at least two categories;
    determining which category of the at least two categories the requesting party belongs; and
    accepting a request if the category of the requesting party is compatible with the category of the data of the target descriptor.

10. The method according to claim 1, further comprising:
    incrementing the counter after each request carried out.

11. A removable support associated with at least one subject, the subject including a person, a company, or an object, the removable support comprising:
    a secure database configured to store quantitative or qualitative data, each datum comprising at least one descriptor and one value,
    the removable support configured to,
        in an initialization state,
            connect to a device for acquiring information,
            receive authentication data response to transmitting authentication information indicating the right to enter information associated with the subject into the secure database, and transmitting to the secure database for the subject a current value corresponding to the descriptor of the datum, the secure database including a request counter associated with one or a plurality of values associated with the datum; and in a state of use, connect to a communication device, receive a request related to the subject from a requesting entity, the request comprising at least one target descriptor and one operator, compare a value of the request counter with a maximum value, carry out the request by applying the operator on the current value corresponding to the target descriptor and producing a response when the value of the request counter is below the maximum value, and return the response to the requesting entity.

12. The removable support of claim 11, wherein the removable support is further configured to:

increment the counter after each request carried out.

* * * * *